United States Patent [19]

Otera et al.

[11] Patent Number: 5,734,007
[45] Date of Patent: Mar. 31, 1998

[54] METHOD FOR PREPARING POLYHYDROXYCARBOXYLIC ACID RESIN

[75] Inventors: Junzo Otera, Okayama; Toru Yano, Hiroshima, both of Japan

[73] Assignee: Nishikawa Rubber Co., Ltd., Hiroshima, Japan

[21] Appl. No.: 674,453

[22] Filed: Jul. 2, 1996

[30] Foreign Application Priority Data

Jul. 18, 1995 [JP] Japan .................. 7-205325

[51] Int. Cl.$^6$ ........................................ C08G 69/26
[52] U.S. Cl. .................. 528/342; 528/354; 528/357; 528/361
[58] Field of Search .................. 528/342, 354, 528/357, 361

[56] References Cited

U.S. PATENT DOCUMENTS 5,386,004  1/1995  Obuchi et al. .................. 528/354

FOREIGN PATENT DOCUMENTS 347185  12/1995  Japan .

*Primary Examiner*—Duc Truong
*Attorney, Agent, or Firm*—Flynn, Thiel, Boutell & Tanis, P.C.

[57] ABSTRACT

There is provided a method for easily preparing a polyhydroxycarboxylic acid resin in a one pot reaction by adding 1,3-substituted-1,1,3,3-tetraorganodistanoxan as a polymerization catalyst to a hydroxycarboxylic acid, such as L-lactic acid containing 10 to 50% of water as a starting material, and stirring while heating under a reduced pressure condition or in an organic solvent.

7 Claims, No Drawings

METHOD FOR PREPARING POLYHYDROXYCARBOXYLIC ACID RESIN

BACKGROUND OF THE INVENTION

This invention relates to a method for preparing a biodegradable resin from a hydroxycarboxylic acid, such as lactic acid, as a starting material.

A polyhydroxycarboxylic acid obtained by the polymerization of a hydroxycarboxylic acid, such as lactic acid, has already been prepared as a biodegradable resin by the following methods:

a) a hydroxycarboxylic acid oligomer is synthesized and then subjected to a cyclization reaction to form a lactone such as a lactide, followed by purification by evaporation and ring opening polymerization;

b) a lactic acid oligomer is synthesized and then crosslinked between molecules thereof using a compound hating a functional group such as an isocyanate; or a hydroxycarboxylic acid is dehydrated and then subjected to a dehydrating condensation reaction using molecular sieves in a reaction mixture thereof containing an organic solvent, such as anisole.

In any conventional method for preparing a polylactic acid resin including the above mentioned one, however, it is necessary to initially dehydrate the hydroxycarboxylic acid because a catalyst is deactivated if the catalyst is directly added thereto. In such a conventional method, while polymers a higher molecular weight can be obtained a longer reaction process and complicated reactions thereof require a number of steps in a production plant and the fractionation or recovery of organic solvents, which results in a problem of increase in cost.

The problem to be solved is that the hydroxycarboxylic acid should be dehydrated because of deactivation of the catalyst caused by direct addition thereof to the acid and, while polymers of higher molecular weight can be obtained a longer reaction process and complicated reactions require a number of steps during the production and purification of the resin in any conventional method for preparing the hydroxycarboxylic acid resin, including a polylactic acid resin.

According to the present invention, a polyhydroxycarboxylic acid resin represented by the following formula:

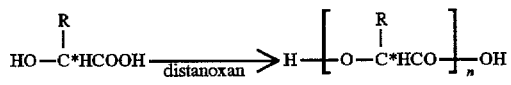

wherein R is CH$_3$, C$_2$H$_5$, H, etc., is prepared in one pot reaction by adding a 1,3-substituted-1,1,3,3-tetraorganodistanoxan represented by the following formula:

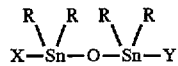

wherein R is CH$_3$, C$_2$H$_5$, C$_4$H$_9$, C$_6$H$_5$, C$_6$H$_5$CH$_2$, etc.,
X is Cl, Br, NCS, etc. and
Y is Cl, Br, NCS, OH, OCH$_3$, OC$_2$H$_5$, OC$_6$H$_5$, etc.,
as a polymerization catalyst of a higher activity to a hydroxycarboxylic acid, such as L-lactic acid, containing 10 to 50% of water as a starting material, and stirring with heating thereof under a reduced pressure condition or in an organic solvent.

Thus, the polyhydroxycarboxylic acid resin can be prepared in a one pot reaction by stirring and refluxing with heating a hydroxycarboxylic acid, such as L-lactic acid, with a 1,3-substituted-1,1,3,3-tetraorganodistanoxan as a polymerization catalyst.

Organic substituents bonded to the tin atoms of the 1,3-substituted-1,1,3,3-tetraorganodistanoxan may include methyl-, ethyl-, propyl-, butyl-, octyl-, allyl-, benzyl-, phenyl- or naphthyl-groups, although a butyl groups is preferable from the viewpoints of solubility, stability and cost of the catalyst.

1,3-Substituents of the 1,3-substituted-1,1,3,3-tetraorgano stanoxan may include either one of halogeno-, thiocyano-, hydroxyl-, alcoxyl- or carboxyl groups.

The amount of the catalyst to be added is not critical, but preferably, is from 0.01 to 0.0000001 mol, based on one mol of monomer from the viewpoints of reaction rate and economical efficiency of the process.

The Hydroxycarboxlic acid used in the present invention is an aliphatic carboxylic acid having an internal hydroxyl group and may includes D-, L- and racemic modifications thereof. More than two kinds of hydroxycarboxylic acids may also be used.

The organic solvent used in the present invention to polymerize the hydroxycarboxylic acid as a solution may include either one having a higher boiling point than and incompatibility with water, and preferably is D-limonene, which is a natural product and has little effect on the environment and, the human body, even if it remains in the resin.

The polyhydroxycarboxylic acid resin of the present invention is useful as agricultural or gardening materials, fishery paints for preventing shells and algae, hot-melt adhesives and the like. Further, if the present polyhydroxycarboxylic acid resin is disposed, of it can be decomposed through hydrolysis or degraded by microorganisms in the soil with the passage of time, and thus be merged into a material cycle in natural environment.

As has been described above, the polyhydroxycarboxylic acid resin can be easily prepared by the present invention.

PREFERRED EMBODIMENT OF THE INVENTION

A glass tube oven GTO-250RS (available from Shibata Kagakukiki Kogyo) was used for solventless polymerization, while a 200 ml eggplant type flask, a T-tube, a 20 ml eggplant type flask for collecting water and an air condenser were used for polymerization in the solvent. The molecular weight of polymers thus prepared was determined by a GPC device for high performance liquid chromatography Type 510 (available from Japan Millipore Ltd.) and a differential refractive index detector Shodex RI-71 with a column GPCKS06M (available from Showa Denko K. K.).

EXAMPLE 1

Portions of 100 millimol (10 g) of 90% L-lactic acid and 0.01 millimol (0.005 g) of moisture-stable 1,3-dichloro-1,1,3,3-tetrabutyldistanoxan were charged in a spherical sample vessel of the glass tube oven, evacuated in the reaction system by means of a vacuum pump while stirring the spherical vessel, and then gradually heated up to a temperature of 200° C. in the glass tube oven to undergo polymerization for 20 hours. The average molecular weight of the polyhydroxycarboxylic acid resin thus obtained was 14,000.

EXAMPLE 2

Portions of 100 millimol (10 g) of 90% L-lactic acid and 0.01 millimol (0.005 g) of moisture-stable 1-chloro-3- hydroxy-1,1,3,3-tetrabutyldistanoxan were charged in a spherical sample vessel of the glass tube oven, evacuated in the reaction system by means of a vacuum pump while stirring the spherical vessel, and then gradually heated up to a temperature of 200° C. in the glass tube oven to undergo polymerization for 20 hours. The average molecular weight of the polyhydroxycarboxylic acid resin thus obtained was 12,000.

EXAMPLE 3

Portions of 100 millimol (10 g) of 90% L-lactic acid and 0.01 millimol (0.005 g) of moisture-stable 1-thiocyano-3-hydroxy-1,1,3,3-tetrabutyldistanoxan were charged in a spherical sample vessel of the glass tube oven, evacuated in the reaction system by means of a vacuum pump while stirring the spherical vessel, and then gradually heated up to a temperature of 200° C. in the glass tube oven to undergo polymerization for 20 hours. The average molecular weight of the polyhydroxycarbexylic acid resin thus obtained was 10,000.

EXAMPLE 4

Portions of 100 millimol (10 g) of 90% L-lactic acid and 0.01 millimol (0.005 g) of moisture-stable 1,3-dithiocyano-3-1,1,3,3-tetrabutyldistanoxan were charged in a spherical sample vessel of the glass tube oven, evacuated in the reaction system by means of a vacuum while stirring the spherical vessel, and then gradually heated up to a temperature of 190° C. in the glass tube oven to undergo polymerization for 20 hours. The average molecular weight of the polyhydroxycarboxylic acid resin thus obtained was 13,000.

EXAMPLE 5

Portions of 90 millimol (10 g) of 90% L-lactic acid, 10 millimol g) of 70% glycolic acid and 0.01 millimol (0.005 g) of moisture-stable 1-chloro-3-hydroxy-1,1,3,3-tetrabutyldistanoxan were charged in a spherical sample vessel of the glass tube oven, evacuated in the reaction system by means of a vacuum pump while stirring the spherical vessel, and then gradually heated up to a temperature of 200° C. in the glass tube oven to undergo polymerization for 20 hours. The average molecular weight of the polyhydroxycarboxylic acid resin thus obtained was 13,000.

EXAMPLE 6

Portions of 1 mol (100 g) of 90% L-lactic acid and 0.21millimol (0.1 g) of moisture-stable 1-chloro-3-hydroxy-1,13,3-tetrabutyldistanoxan were charged in a 200 ml eggplant type flask and 50 ml of D-limonene further added thereto. After attaching a T-tube, a 20 ml eggplant type flask for collecting water and an air condenser to the reaction system, the reaction mixture was refluxed with heating and stirred to undergo a polymerization reaction for 48 hours while removing water out of the system. The average molecular weight of the polyhydroxycarboxylic acid resin thus obtained was 22,000.

What is claimed is:

1. A method for preparing a polyhydroxycarboxylic acid resin in a one pot reaction comprising the steps of adding a 1,3-substituted-1,1,3, 3-tetraorganodistanoxan to a hydroxycarboxylic acid containing 10 to 50% water to form a reaction mixture and stirring while heating the reaction mixture under a reduced pressure.

2. The method of claim 1, wherein the 1,3-substituted-1,1,3,3-tetraorganodistanoxan has the formula:

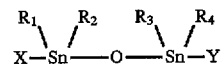

wherein $R_1$, $R_2$, $R_3$ and $R_4$ are independently methyl, ethyl, propyl, butyl, octyl, allyl, benzyl, phenyl or naphthyl and X and Y are independently halogeno, thiocyano, hydroxyl, alcoxyl or carboxyl.

3. A method for preparing a polyhydroxycarboxylic acid resin in a one pot reaction comprising the steps of adding a 1,3-substituted-1,1,3, 3-tetraorganodistanoxan to a hydroxycarboxylic acid containing 10 to 50% water to form a reaction mixture and stirring while heating the reaction mixture in an organic solvent.

4. The method of claim 3, wherein the 1,3-substituted-1,1,3,3-tetraorganodistanoxan has the formula:

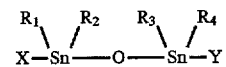

wherein $R_1$, $R_2$, $R_3$ and $R_4$ are independently methyl, ethyl, propyl, butyl, octyl, allyl, benzyl, phenyl or naphthyl and X and Y are independently halogeno, thiocyano, hydroxyl, alcoxyl or carboxyl.

5. The method of claim 2, wherein at least one of $R_1$, $R_2$, $R_3$ and $R_4$ are butyl.

6. The method of claim 4, wherein at least one of $R_1$, $R_2$, $R_3$ and $R_4$ are butyl.

7. The method of claim 3, wherein the organic solvent is D-limonene.

* * * * *